US009563366B2

(12) United States Patent
Brown et al.

(10) Patent No.: US 9,563,366 B2
(45) Date of Patent: Feb. 7, 2017

(54) USING QUEUES CORRESPONDING TO ATTRIBUTE VALUES ASSOCIATED WITH UNITS OF WORK AND SUB-UNITS OF THE UNIT OF WORK TO SELECT THE UNITS OF WORK AND THEIR SUB-UNITS TO PROCESS

(71) Applicant: International Business Machines Corporation, Armonk, NY (US)

(72) Inventors: Theresa M. Brown, Tucson, AZ (US); Nicolas M. Clayton, Warrington (GB); Lokesh M. Gupta, Tucson, AZ (US); Theodore T. Harris, Jr., Tucson, AZ (US); Brian D. Hatfield, Tucson, AZ (US); Matthew Sanchez, Tucson, AZ (US); David B. Schreiber, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 129 days.

(21) Appl. No.: 14/277,023

(22) Filed: May 13, 2014

(65) Prior Publication Data
US 2015/0331614 A1 Nov. 19, 2015

(51) Int. Cl.
G06F 9/46 (2006.01)
G06F 3/06 (2006.01)
G06F 9/50 (2006.01)

(52) U.S. Cl.
CPC ............. *G06F 3/0611* (2013.01); *G06F 3/06* (2013.01); *G06F 3/0659* (2013.01);
(Continued)

(58) Field of Classification Search
None
See application file for complete search history.

(56) References Cited

U.S. PATENT DOCUMENTS 4,387,427 A 6/1983 Cox et al.
5,937,428 A * 8/1999 Jantz ...................... G06F 3/061
710/37

(Continued)

FOREIGN PATENT DOCUMENTS

WO 2004109473 12/2004

OTHER PUBLICATIONS

Thomasian "Priority Queueing in Raids Disk Arrays With an NVS Cache", 1995 IEEE, pp. 168-172.*

(Continued)

*Primary Examiner* — Van Nguyen
(74) *Attorney, Agent, or Firm* — David W. Victor; Konrad Raynes Davda & Victor LLP

(57) ABSTRACT

Provided are a computer program product, system, and method for using queues corresponding to attribute values associated with units of work and sub-units of the unit of work to select the units of work and their sub-units to process. There are a plurality of work unit queues, each associated with different work unit attribute values that are associated with units of work, wherein the work unit queues include records for units of work to process having work unit attribute values associated with the work unit attribute values of the work unit queues. There are a plurality of work sub-unit queues, wherein each are associated with different work sub-unit attribute values that are associated with sub-units of work. Records are added for work sub-units of a unit of work to the work sub-unit queues, and records are selected from the work sub-unit queues to process the sub-units of work.

24 Claims, 11 Drawing Sheets

(52) U.S. Cl.
CPC .......... *G06F 3/0665* (2013.01); *G06F 3/0689* (2013.01); *G06F 9/505* (2013.01); *G06F 9/5016* (2013.01); *G06F 2003/0692* (2013.01)

(56) References Cited

U.S. PATENT DOCUMENTS

| | | | |
|---|---|---|---|
| 6,745,258 B1* | 6/2004 | Pellegrino | G06F 3/0607 710/107 |
| 6,981,074 B2* | 12/2005 | Oner | G06F 13/28 370/218 |
| 6,985,900 B2 | 1/2006 | Codd et al. | |
| 7,127,507 B1* | 10/2006 | Clark | H04L 43/045 709/224 |
| 7,302,448 B2* | 11/2007 | Schwendiman | G06F 9/44505 |
| 7,380,156 B2* | 5/2008 | Rodrigues | G06F 11/008 711/114 |
| 7,389,507 B2* | 6/2008 | Dickson | G06F 8/314 711/114 |
| 7,499,951 B2* | 3/2009 | Mueller | G06Q 10/06 705/7.11 |
| 7,730,257 B2* | 6/2010 | Franklin | G06F 3/061 711/114 |
| 7,765,549 B1 | 7/2010 | Lauer | |
| 7,827,282 B2 | 11/2010 | Sorrentino et al. | |
| 7,840,526 B1* | 11/2010 | Baltazar | G06Q 10/06 707/608 |
| 8,127,305 B1 | 2/2012 | Leonard et al. | |
| 8,230,426 B2* | 7/2012 | Powers | G06F 9/505 712/28 |
| 8,356,126 B2* | 1/2013 | Ashmore | G06F 3/0613 710/56 |
| 8,473,648 B2* | 6/2013 | Chakhaiyar | G06F 3/0611 710/264 |
| 8,516,189 B2* | 8/2013 | Sarkar | G06F 3/0613 711/114 |
| 8,700,834 B2* | 4/2014 | Horn | G06F 13/16 710/107 |
| 8,751,861 B2* | 6/2014 | Nair | G06F 3/0611 714/6.21 |
| 8,805,793 B2* | 8/2014 | Patiejunas | G06F 17/30289 707/687 |
| 8,839,249 B2 | 9/2014 | Mills et al. | |
| 8,910,168 B2 | 12/2014 | Mital et al. | |
| 9,268,503 B2* | 2/2016 | Klemm | G06F 3/0689 |
| 2002/0178282 A1 | 11/2002 | Mysore et al. | |
| 2004/0133680 A1 | 7/2004 | Sorrentino et al. | |
| 2005/0102398 A1 | 5/2005 | Zhang et al. | |
| 2007/0050773 A1 | 3/2007 | Tayyar et al. | |
| 2007/0133781 A1* | 6/2007 | Febonio | H04M 3/5175 379/265.05 |
| 2011/0225583 A1 | 9/2011 | Suh et al. | |
| 2011/0286444 A1 | 11/2011 | Petrovykh | |
| 2013/0125127 A1 | 5/2013 | Mital et al. | |
| 2014/0189695 A1 | 7/2014 | Xu et al. | |
| 2015/0277984 A1* | 10/2015 | Abraham | G06F 9/5077 718/1 |

OTHER PUBLICATIONS

Zhenjie et al. "An Optimization Load Balancing Algorithm Design in Massive Storage System", 2009 IEEE, pp. 310-313.*
Ming et al. "Queue Network Modeling Approach to Analysis of the Optimal Stripe Unit Size for Disk Arrays under Synchronous I/O Workloads", 2006 IEEE, 7 pages.*
G. Castets, et al., "IBM TotalStorage Enterprise Storage Server PPRC Extended Distance", IBM Corp., Jun. 2002, Total 184 pages.
"A Method and System for the Optimal Background Copy Via Adjusting PPRC Path Automatically", dated Jan. 26, 2012, An IP.com Prior Art Database Technical Disclosure, Total 6 pages.
Matta, I et al., "Differentiated Predictive Fair Service for TCP Flows", dated 2000, Computer Science Department Boston University, Boston, MA , Total 10 pgs.
Motorola, Inc., et al., "QOS and Fairness for CDMA Packet Data", dated May 1, 2000, An IP.com Prior Art Database Technical Disclosure, Total 8 pages.
U.S. Patent Application U.S. Patent Application U.S. Appl. No. Unknown, filed May 13, 2014, titled "Using Queues Corresponding to Attribute Values Associated With Units of Work to Select the Units of Work to Process", by inventors T.M. Brown, et al., (18.530).
U.S. Patent Application U.S. Patent Application for U.S. Patent Application U.S. Appl. No. Unknown, filed May 13, 2014, titled "Using Queues Corresponding to Attribute Values and Priorities Associated With Units of Work and Sub-Units of the Unit of Work to Select the Units of Work and Their Sub-Units to Process", by inventors T.M. Brown, et al., (18.533).
Office Action dated Feb. 26, 2016, pp. 24, for U.S. Appl. No. 14/277,018, filed May 13, 2014, 18.530.
Office Action dated Mar. 10, 2016, pp. 27, for U.S. Appl. No. 14/277,026, filed May 13, 2014, 18.533.
Response dated Jun. 10, 2016, pp. 16, to Office Action dated Mar. 10, 2016, pp. 27, for U.S. Appl. No. 14/277,026, filed May 13, 2014, 18.533.
Response dated Jun. 27, 2016, pp. 14, to Office Action dated Feb. 26, 2016, pp. 24, for U.S. Appl. No. 14/277,018, filed May 13, 2014, 18.530.
L. Wang, et al., "Influence of virtual networks to Internet collective behavior", Acta Phys. Sin., 2007, 56(1): 36-42.
Notice of Allowance dated Aug. 12, 2016, pp. 44, for U.S. Appl. No. 14/277,026, filed May 13, 2014, 18.533.
Final Office Action dated Oct. 5, 2016, pp. 27, for U.S. Appl. No. 14/277,018, filed May 13, 2014, 18.530.
Notice of Allowance dated Sep. 23, 2016, pp. 13, for U.S. Appl. No. 14/277,026, filed May 13, 2014, 18.533.

* cited by examiner

USING QUEUES CORRESPONDING TO ATTRIBUTE VALUES ASSOCIATED WITH UNITS OF WORK AND SUB-UNITS OF THE UNIT OF WORK TO SELECT THE UNITS OF WORK AND THEIR SUB-UNITS TO PROCESS

BACKGROUND OF THE INVENTION

1. Field of the Invention

The present invention relates to a computer program product, system, and method for using queues corresponding to attribute values associated with units of work and sub-units of the unit of work to select the units of work and their sub-units to process.

2. Description of the Related Art

To perform work in a workload management environment, the workload manager may queue units of work in a work queue and then select the units of work from the queue to process. A workload process may search through the queued data to find a "best candidate" to process, using an algorithm to provide the required fairness. One drawback of this type of "best candidate" selection process is that it requires searching through large amounts of queued data looking for the "best candidate". Another aged selection criteria that may be used in conjunction with best candidate algorithm selects queued data that has been on the queue for an excessive duration. The combination of these two algorithms independently working on the queue may yield unpredictable selection results.

When processing a volume to transfer having extents spread across ranks of disks in a Redundant Array of Independent Disk (RAID) configuration, the volume may be divided into parts to process and the parts may be processed according to their RAID rank. In certain implementations, there may be part agents to process different parts of the volume, and each part agent would process tracks in a RAID rank assigned to that part process.

There is a need in the art for improved techniques for queuing units of work to process.

SUMMARY

Provided are a computer program product, system, and method for using queues corresponding to attribute values associated with units of work and sub-units of the unit of work to select the units of work and their sub-units to process. There are a plurality of work unit queues, wherein each of the work unit queues are associated with different work unit attribute values that are associated with units of work, wherein a plurality of the work unit queues include records for units of work to process having work unit attribute values associated with the work unit attribute values of the work unit queues. There are further a plurality of work sub-unit queues, wherein each of the work sub-unit queues are associated with different work sub-unit attribute values that are associated with sub-units of work. Records are added for work sub-units of a unit of work to the work sub-unit queues in response to processing the unit of work from one of the work unit queues. The records for the work sub-units are selected from the work sub-unit queues to process the sub-unit of work.

DETAILED DESCRIPTION

One drawback of prior art solutions that divide a volume into a plurality of parts and then process those parts according to RAID rank, is that larger volumes are divided into larger sized parts, while smaller volumes are divided into smaller sized parts. This makes fairness between different pieces of synchronization work more difficult. Another drawback is that the parts of the volume typically span across different RAID ranks which are used to read the data to be synchronized. This results in more complex code, which synchronizes the data from one RAID rank within the volume before moving on to the data from another RAID rank. Another drawback is that dividing the volume into parts results in copies reading from different parts of the volume simultaneously, which results in large seeks on the drives, which causes decreased performance.

Described embodiments address the above problems by providing techniques for queuing units of work and sub-units of the units of work on multiple queues corresponding to attribute values associated with the units of work and their sub-units. A workload manager may then cycle through the queues to select units of work and sub-units of work to process. This allows for workload balancing based on different attribute values for different attribute types associated with a unit of work and sub-unit of work.

Figure 1:
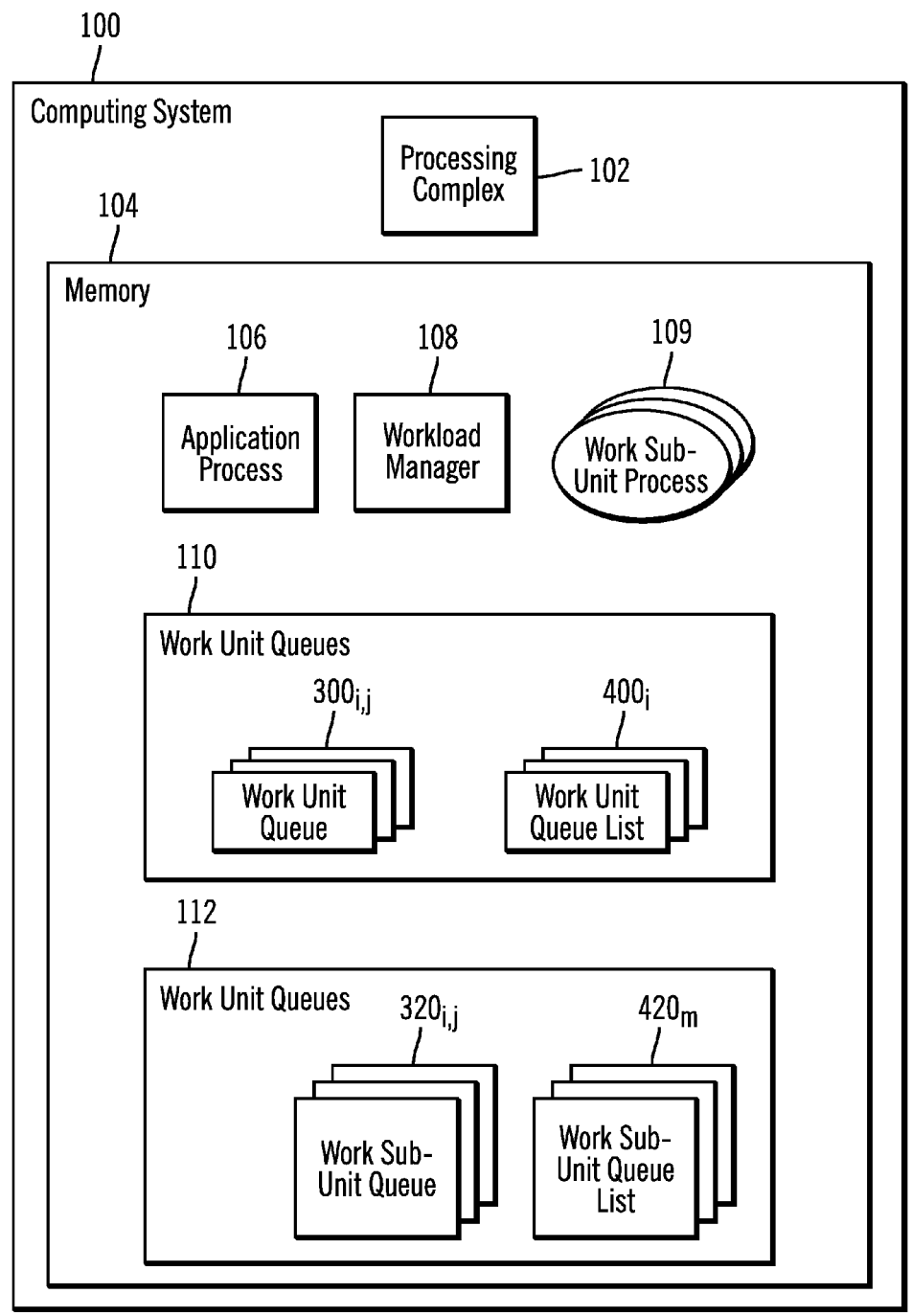
FIG. 1 illustrates an embodiment of a workload processing computing environment.

FIG. 1 illustrates an embodiment of a computing environment for processing units of work which are comprised of sub-units of work, including a computing system 100 having a processor complex 102, comprising one or more microprocessor units, and a memory 104. The memory 104 includes programs to execute, including an application process 106 that creates units of work to process that are submitted to a workload manager 108 to schedule the execution of the units of work from the application process. The workload manager 108 may break the unit of work from the application process 106 into multiple sub-units of work and then invoke work sub-unit processes 109 to independently process the sub-units of work.

The units of work to process may comprise a computing task, application operation, storage access operation, database access operation, data movement operation, or any other type of computing operation with respect to data and computing resources. Each unit of work may be associated with a plurality of attributes for the unit of work, such as a device that would be used to process the unit of work (e.g., memory, storage, adapters, processors, etc), customers or users associated with the unit of work, resources that would be allocated to the unit of work, etc. Sub-units of a unit of work comprise smaller portions or parts of a large unit of work.

To balance processing of units of work and their sub-units according to different attribute values of attribute types associated with the unit of work and attributes of the sub-units of work, the workload manager 108 may maintain a plurality of work unit queues $300_{i,j}$ for the different attribute types 1 . . . n for the units of work. In one embodiment, for each attribute type i, there may be one queue for each attribute value j that may be assigned for the work unit attribute type i. This allows one queue for each work unit attribute value that may be assigned to the unit of work, to allow queuing by attribute type i and attribute value j. The workload manager 108 may maintain work unit queues 110 having work unit queues $300_{i,j}$, then balance selection of queued units of works from the work unit queues $300_{i,j}$ to balance unit of work selection by attribute values associated with the units of work.

Figure 2:
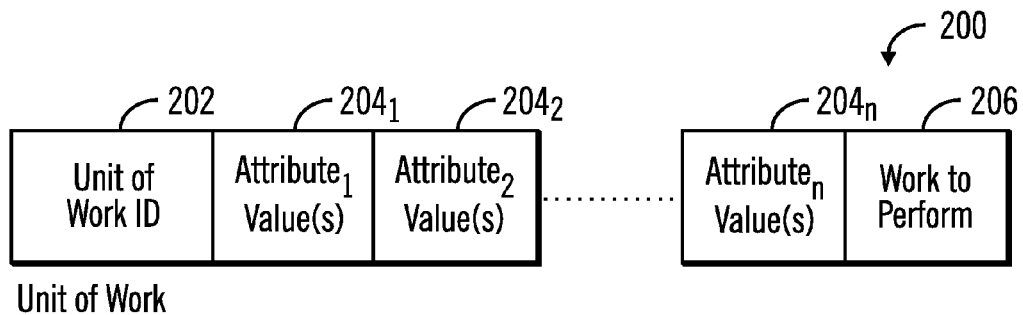
FIG. 2 illustrates an embodiment of a representation of a unit of work to process.

Further, the workload manager 108 may maintain work sub-unit queues 112 including work sub-unit queues $320_{i,j}$ for the possible work sub-unit attribute values that may be associated with the sub-units of work, so that a record for a sub-unit of work is queued in the work sub-unit queue $320_{i,j}$ for the attribute value associated with the sub-unit of work. This allows the workload manager 108 to balance selection of queued sub-units of work from the work sub-unit queues $320_{i,j}$ to balance sub-unit of work selection by attribute values associated with the sub-units of work FIG. 2 illustrates an embodiment of a unit or sub-unit of work 200 including information and metadata on the unit of work to process, including a unit or sub-unit of work identifier (ID) 202, one or more attribute values associated with the unit of work for each attribute type $204_1$ . . . $204_n$, and the work to perform 206, which may provide the necessary information needed by the workload manager 108 to process the unit of work, like operations to perform, pointer to operation, code to execute, data transfer operation to perform, etc. For a unit of work, the work to perform 206 may indicate the sub-units of work for the unit of work. For a sub-unit of work, the work to perform 206 may comprise the specific work for a sub-unit of work. Each unit of work may comprise a unique set of sub-units of work.

Figure 3:
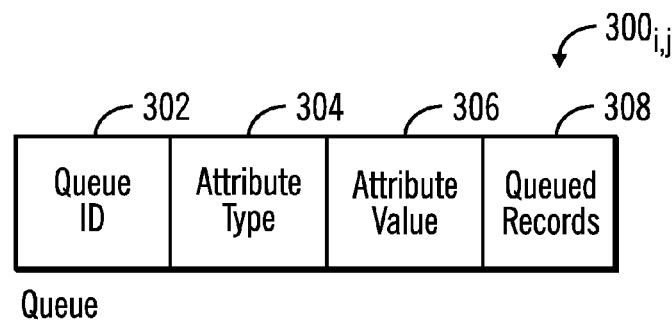
FIG. 3 illustrates an embodiment of a queue.

FIG. 3 illustrates an embodiment of a queue $300_{i,j}$, for attribute type i and attribute value j, which includes a queue ID 302, an attribute type 304, an attribute value 306 associated with the queue 302, and queued records 308 in the queue $300_{i,j}$. Thus, there may be multiple queues, one for each of the attribute values j for the attribute type i. Each record in the queue 308 identifies a unit of work 200 to process. The workload manager 108 may always go to process the first record in the queue $300_{i,j}$, where the queue may be ordered according to a basis, such as last in first out (LIFO).

FIG. 3 also illustrates the format of a work sub-unit queue $320_{i,j}$. There may be one or more attribute types for the work sub-unit queues.

Figure 4:
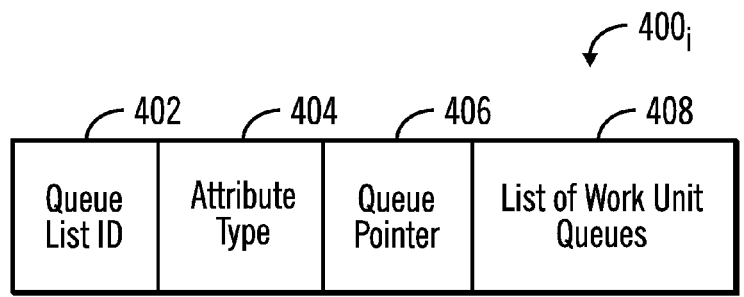
FIG. 4 illustrates an embodiment of a queue list.

FIG. 4 illustrates an embodiment of a queue list $400_i$ the workload manager 108 maintains for each attribute type i, for attribute types 1 . . . n. A queue list $400_i$ for attribute i includes an identifier 402 identifying the queue list for the attribute type i; an attribute type 404 or attribute type i; and a queue pointer 406 identifying the last queue $300_{i,j}$ indicated in the list of work unit queues 408 processed for the attribute type 404. The list 408 of queues $300_{i,j}$ may be ordered according to an order in which indication of the queue $300_{i,j}$ was added to the queue list 400i, such as a last-in-first out (LIFO) ordering.

Similarly, a work sub-unit queue list $420_m$ may include the fields 402, 404, 406, 408, having work-sub unit queues $320_{i,j}$ for an attribute value m, where m may be an attribute that is different from or the same as the attribute i of the work sub-unit queue $320_{i,j}$.

Figure 5:
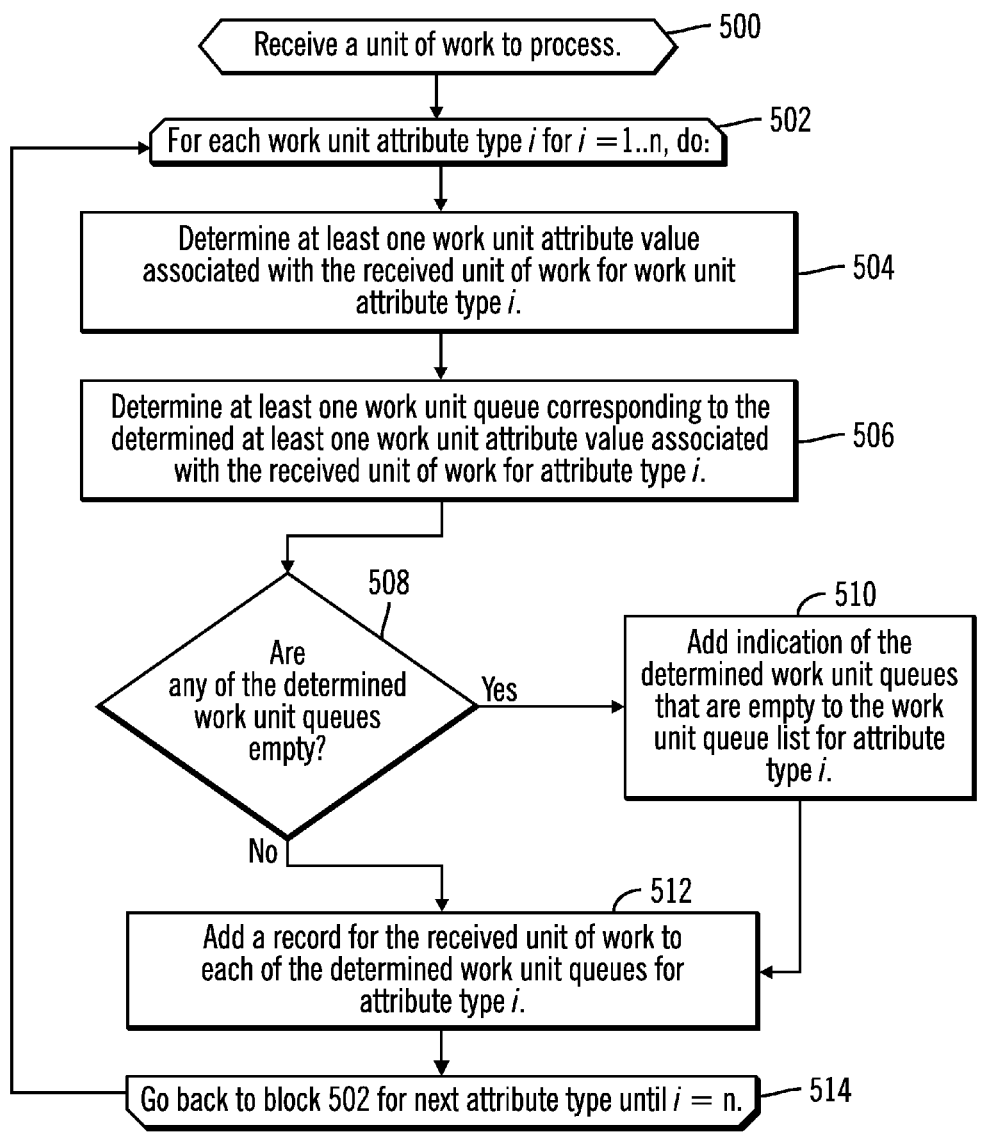
FIG. 5 illustrates an embodiment of operations to place a received unit of work on the queues.

FIG. 5 illustrates an embodiment of operations performed by the workload manager 108 to queue a new received unit of work 200 in the work unit queues $300_{i,j}$. A loop of operations is performed at blocks 502 through 514 for each attribute type i of the n attribute types for which one or more work unit attribute values are associated with the unit of work 200. At block 504, a determination is made of at least one work unit attribute value $204_i$ associated with the received unit of work for attribute type i. The workload manager 108 then determines (at block 506) at least one work unit queue $300_{i,j}$ corresponding to the determined at least one work unit attribute value j (indicated in field $204i$) of the received unit of work 200 for attribute type i. If (at block 508) any of the determined work unit queues $300_{i,j}$ are empty, then the workload manager 108 adds (at block 510) indication of the determined work unit queues that are empty to the work unit queue list $400_i$ for work unit attribute type i. The queue list $400_i$ indicates the queues $300_{i,j}$ for attribute i that have records to process. Thus, if a queue $300_{i,j}$ determined at block 506 is empty, then that would mean it is not on the appropriate queue list 400i and needs to be added because a record will soon be added to that queue $300_{i,j}$.

If (at block 508) no determined work unit queue $300_{i,j}$ is empty or after adding indication of the empty queue to the queue list i (at block 510), the workload manager 108 adds (at block 512) a record for the received unit of work 200 to the queued records 304 for each of the determined work unit queues $300_{i,j}$ for work unit attribute type i. Control then proceeds back to block 502 until processing is performed for all n work unit attribute types. In this way, a record for a unit of work may be added to multiple different work unit queues for different attribute values and attribute types to allow for selection for processing by the workload manager 108 when processing the queues $300_{i,j}$.

Figure 6:
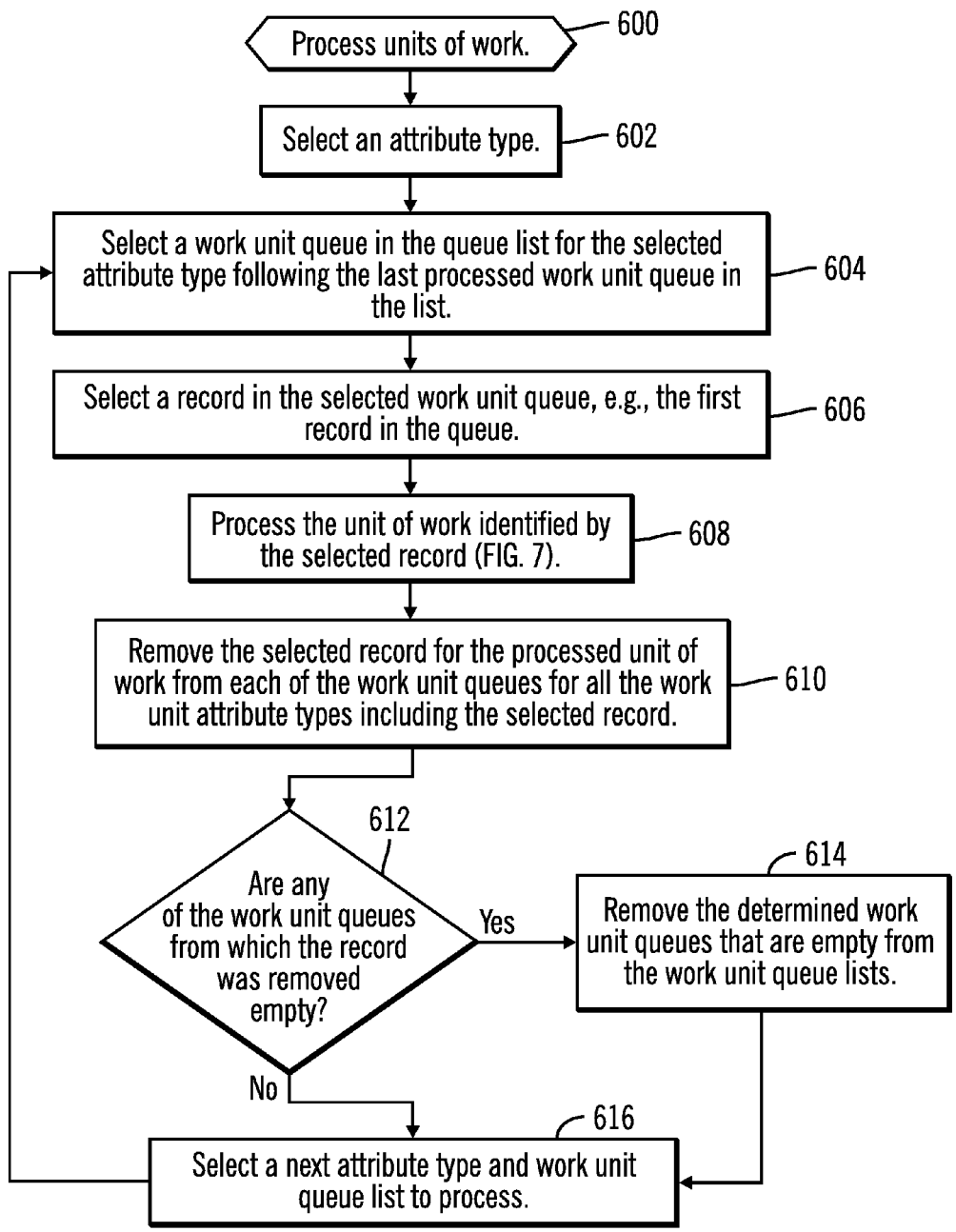
FIG. 6 illustrates an embodiment of operations to select a unit of work from one of the queues.

FIG. 6 illustrates an embodiment of operations performed by the workload manager 108 to process units of work 200 from the work unit queues $300_{i,j}$. Upon initiating (at block 600) unit of work processing, the workload manager 108 selects a work unit attribute type i. The workload manager 108 may select work unit attribute types based on a cyclical or round robin algorithm to cycle through all possible attribute types before continuing the cycle from the start. Alternative techniques may be used to select a work unit attribute type i. The workload manager 108 then selects (at block 604) a work unit queue $300i,j$ in the work unit queue list $400_i$ for the selected work unit attribute type i following the last processed work unit queue in the list $400_i$, which may be identified by the queue pointer 406. A record is then selected (at block 606) from the queued records 308 in the selected work unit queue $300_{i,j}$ which may comprise the first record in the queue. The workload manager 108 may then perform (at block 608) the operations of FIG. 7 to break the unit of work into sub-units of work to queue on the work sub-unit queues $320_{i,j}$ to be processed by the work sub-unit processes 109, which may independently process work sub-unit queue lists $420_m$ to select work sub-unit queues $320i,j$ to process to select work sub-units to process. In one embodiment, there may be a separate work sub-unit process 109 to independently process one of the work sub-unit queue lists $420_m$ to select work sub-unit queues $320_{i,j}$ to process.

The workload manager 108 may then remove (at block 610) the selected record for the processed unit of work from each of the plurality of work unit queues $300_{i,j}$ including the selected record for all the work unit attribute types for i=1 . . . n. Thus, the record is removed from all the work unit queues across all work unit attribute types in which the work unit record was previously included. If (at block 612) any of the work unit queues $300_{i,j}$ from which the record was removed have become empty as a result of the removal, then those empty work unit queues $300_{i,j}$ are removed (at block 614) from the queue lists $400_i$ in which they were included for all attribute types. The workload manager 108 may then select (at block 616) a next work unit attribute type (i+1) and corresponding work unit queue list (i+1) to process.

With the described embodiments of FIGS. 5 and 6, a record for a single unit of work is placed on multiple work unit queues, or on each queue that corresponds to an attribute value for an attribute type associated with the unit of work. When the workload manager 108 cycles through processing the work unit queues $300_{i,j}$ for different attribute types i and values j, that unit of work may be selected from any of the work unit queues $300_{i,j}$ to which it was added. In this way, the selection of units of work 200 to process are balanced across the attribute types and attribute values associated with the unit of work.

Figure 7:
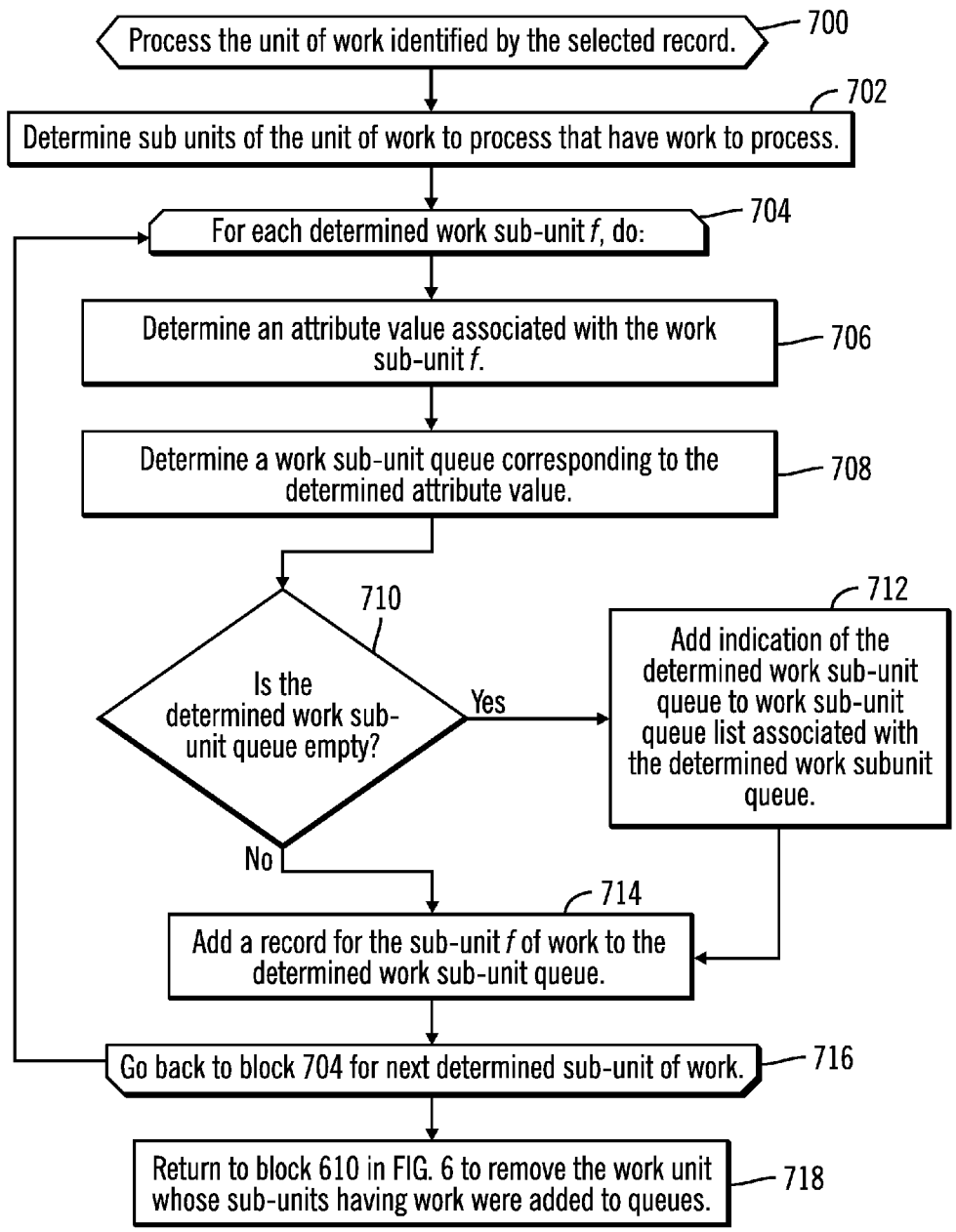
FIG. 7 illustrates an embodiment of operations to process the sub-units of work when processing a unit of work to add records to the work sub-unit queues for the sub-units of work to process.

FIG. 7 illustrates an embodiment of operations performed by the workload manager 108 to process the sub-units of work of the processed unit of work, which is processed at block 608 in FIG. 6. Upon initiating (at block 700) operations to process the sub-units of work, the workload manager 108 determines (at block 702) sub-units of the unit of work to process that have work to process. Not all of the sub-units of the unit of work may have work to process and, in such case, only those sub-units of work having work are processed. A loop of operations is performed at blocks 704 through 716 for each determined sub-unit of work f having work to process. At block 706, the workload manager 108 determines an attribute value associated with the work sub-unit f and determines (at block 708) a work sub-unit queue $320_{i,j}$ corresponding to the determined attribute type i and value j. If (at block 710) the determined work sub-unit queue $320_{i,j}$ is empty, then indication of the determined work sub-unit queue $320_{i,j}$ is added (at block 712) to the work sub-unit queue list $420_m$ associated with the determined work sub-unit queue $320_{i,j}$. A work sub unit queue list $420m$ may be associated with a work sub-unit queue $320_{i,j}$ according to an attribute type 404 value different from the attribute type i of the queue $320_{i,j}$.

If (at block 710) the determined work sub-unit queue $320_{i,j}$ is not empty or after adding indication of the empty work sub-unit queue to the work sub-unit queue list (at block 712), then the workload manager 108 adds (at block 714) a record for the sub-unit of work to the queued records 308 for the determined work sub-unit queue $320_{i,j}$. Control then proceeds (at block 716) back to block 704 until processing is performed for all of the determined sub-units of work having work to process. Control then returns (at block 718) to block 610 in FIG. 6 to complete processing the unit of work after all the sub-units of the unit of work are added to the work sub-unit queues $320_{i,j}$.

In certain embodiments, sub-units of work from one unit of work that have different attribute values are added to different work sub-unit queues. In this way, sub-units of work for different units of work may be queued on one work sub-unit queue $320_{i,j}$ to balance the processing of sub-units of work across attributes of the sub-units of work.

Figure 8:
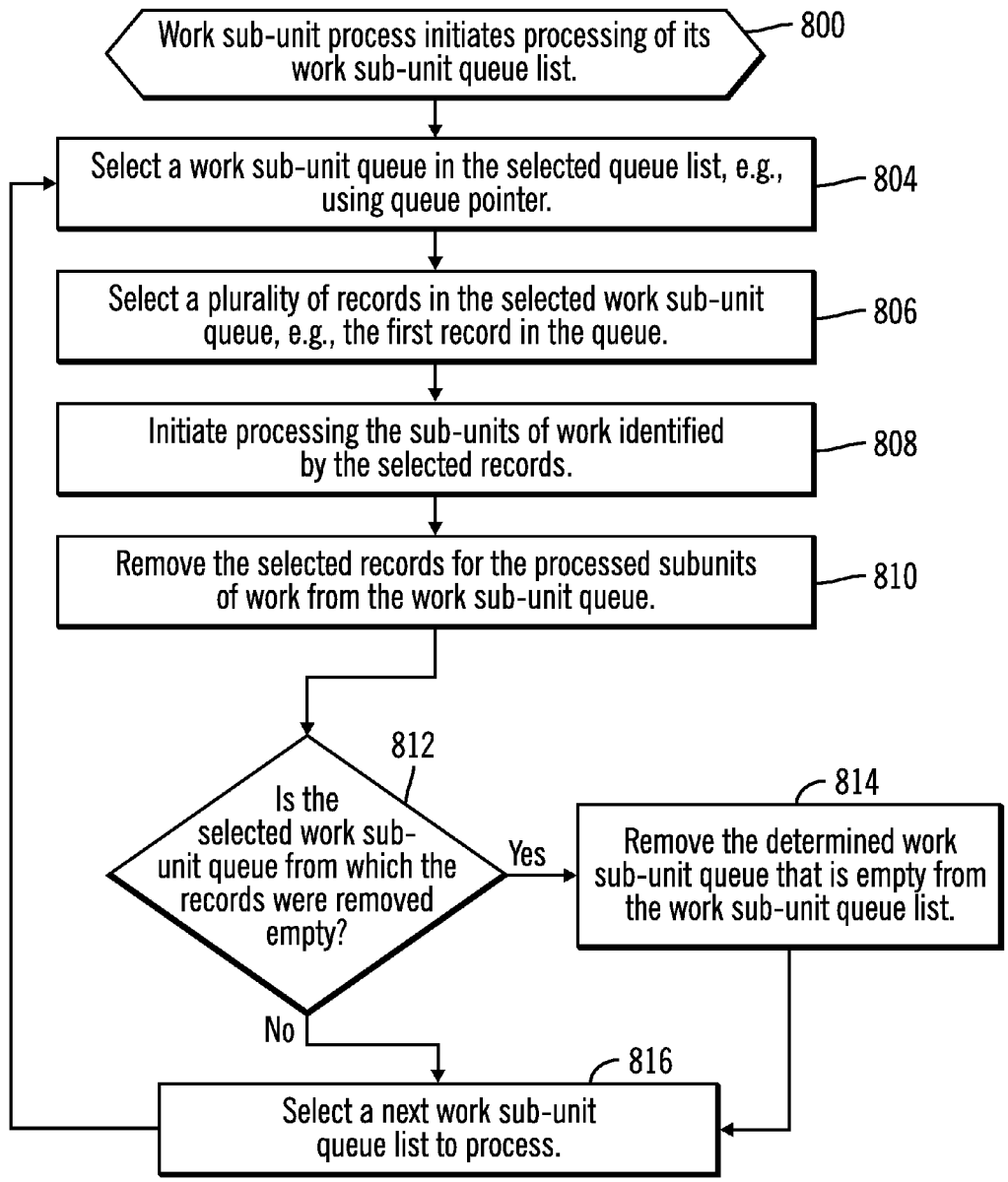
FIG. 8 illustrates an embodiment of operations to select a sub-unit of work from one of the work sub-unit queues.

FIG. 8 illustrates an embodiment of operations the sub-unit processes 109 perform to process a sub-unit of work from the work sub-unit queues 112. At block 800, a work sub-unit process 109 initiates (at block 800) processing the work sub-unit queue list $420_m$ associated with the process 109. to process. The work sub-unit process 109 selects (at block 804) a work sub-unit queue $320_{i,j}$ in the selected work sub-unit queue list $420_m$, such as by using queue pointer 406. The work sub-unit process 109 selects (at block 806) one or more records in the selected work sub-unit queue $320_{i,j}$ starting from the first record in the queue, and initiates processing (at block 808) of the sub units of work identified by the selected records.

The work sub-unit process 109 may then remove (at block 810) the selected records for the sub-units of work for which processing is initiated from the work sub-unit queue $320_{i,j}$ including the selected record. In one embodiment, the selected records may be removed from the queue $320_{i,j}$ upon the work sub-unit process 109 initiating processing of the work sub-units, without completing the processing of the work sub-units. If (at block 812) the work sub-unit queue $320_{i,j}$ from which the records were removed is empty as a result of the removal, then that empty work sub-unit queue $320_j$ is removed (at block 814) from the queue list $420_i$ in which the record is included. The work sub-unit process 109 may then select (at block 816) a next work sub-unit queue list $420_{(j+1)}$.

With the described embodiments of FIGS. 7 and 8, records for sub-units of work for a single unit of work may be placed on one or more work sub-unit queues, such that work sub-units from multiple units of work may be included on the same work sub-unit queue. The work sub-unit queues may be placed on an associated work sub-unit queue lists. In this way, the selection of work sub-units to process are balanced based on the work sub-unit attributes of the work sub-unit queues.

Figure 9:
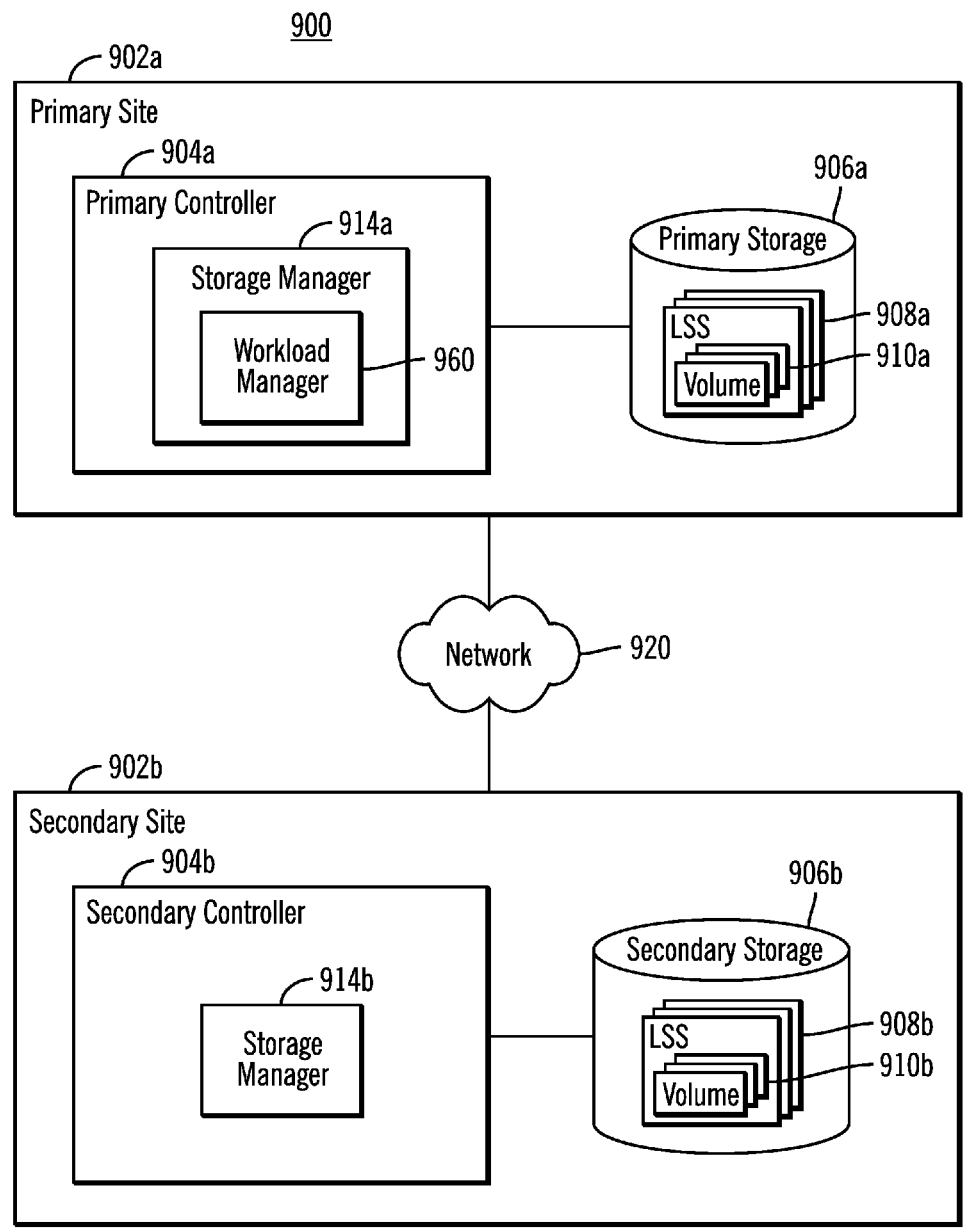
FIG. 9 illustrates an embodiment of a data storage environment.

FIG. 9 illustrates an embodiment of a storage environment 900 in which the workload manager 108 may be deployed, having a primary site 902a and a secondary site 902b, where the secondary site 902b provides a remote site backup of volumes and data at the primary site 902a. One or more primary controllers 904a at the primary site 902a manage primary storages 906a each having one or more logical subsystems (LSSs) 908a providing a grouping of one or more volumes 910a, where each volume 910a stores a plurality of extents of data. The primary controller 904a mirrors the volumes 910a in their LSSs 908a to a secondary controller 904b at the secondary site 902b over a network 920 to store in secondary volumes 910b in LSSs 908b at the secondary storage 906b at the secondary site 902b. In this way, there is a mirror relationship between primary site 902a volumes 910a and secondary site 902b volumes 910b. The primary controller 904a may implement the mirror relationship by copying all writes to extents in the volumes 910a to the secondary controller 904b to store in the secondary storage 906b.

The volumes 910a, 910b may be allocated extents of data configured in the storages 906a, 906b, respectively, where each extent is assigned blocks or tracks of data in the storages 906a, 906b.

The primary controller 904a includes a storage manager 914a for managing the transfer or migration of data transferred between hosts (not shown) and the primary storage 906a to the secondary controller 904b to store on the secondary storage 906b so that the secondary storage 906b mirrors the data in the primary storage 906a. In this way, writes to the primary storage 906a may be transferred to the secondary controller 904b to write to the secondary storage 906b. The secondary controller 904b also includes a storage manager 914b for managing the storage of data from the primary controller 904a and transfer of data with respect to hosts (not shown) to the secondary storage 906b.

The storage manager 914a may include a workload manager 960 that comprises an implementation of the workload manager 108 described above with respect to FIGS. 1-8 to manage data transfer operations of volumes as units of work to be queued in different work unit queues based on attributes of the volumes 910a to be transferred. The extents of a volume comprise the sub-units of work to include on the work sub-unit queues.

The storages 906a and 906b may store data in a Redundant Array of Independent Disks (RAID) configuration. The storages 906a and 906b may each comprise one or more storage devices known in the art, such as interconnected storage devices, where the storage devices may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc. The network 920 may comprise one or more networks, such as one or more interconnected Local Area Networks (LAN), Storage Area Networks (SAN), Wide Area Network (WAN), peer-to-peer network, wireless network, etc.

Figure 10:
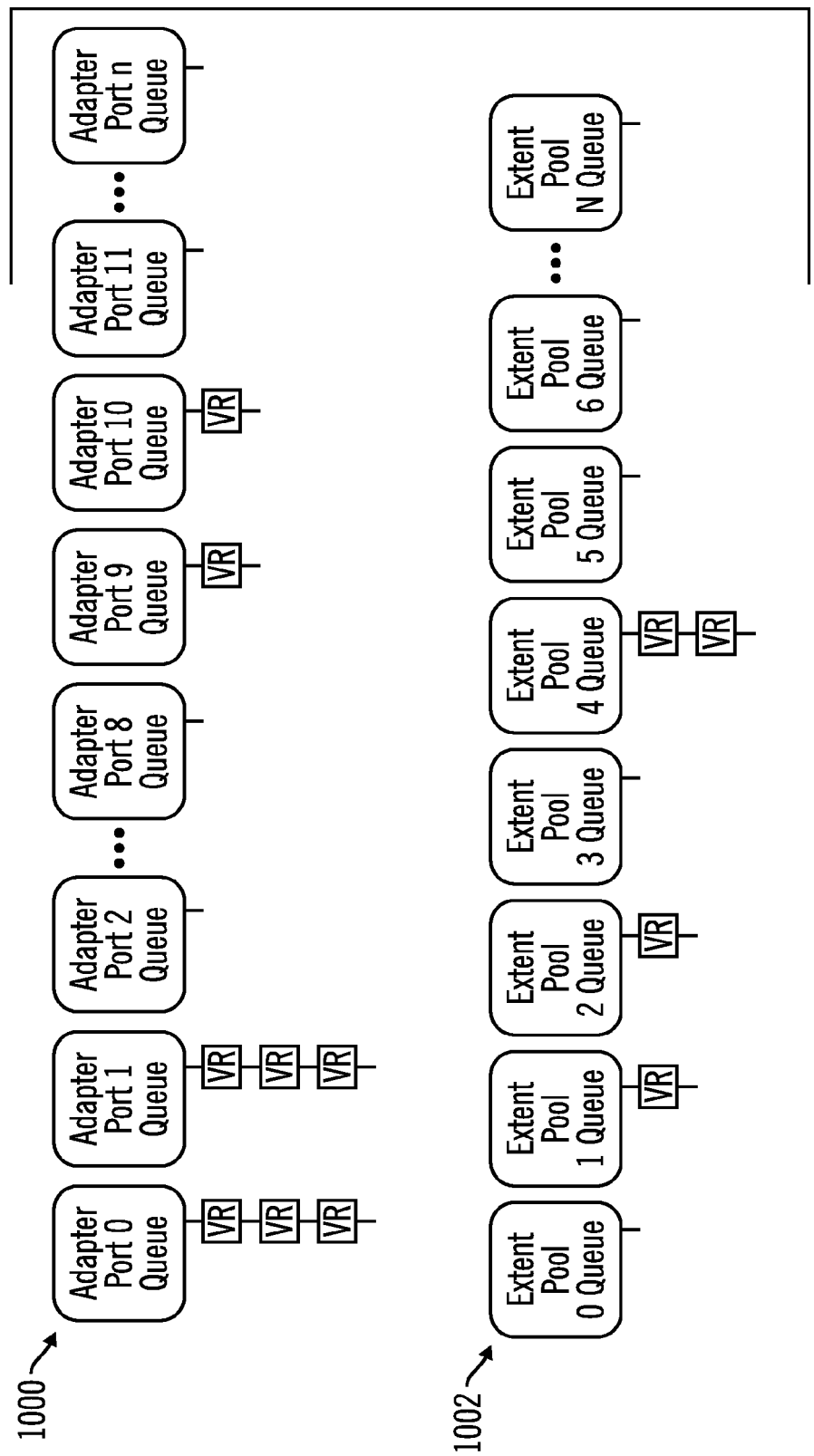
FIG. 10 illustrates an embodiment of work unit queues used in a data storage environment.

FIG. 10 illustrates an embodiment of queues for two different attribute types, an adapter port type and an extent pool type. There are adapter port queues 1000 having a queue for each possible adapter port in the primary controller 904a that may be used to form a path over which the volume can be transferred. The record (VR) for a volume to transfer may be added to each adapter port queue 1000 for a port in the paths over which the particular volume may be transferred. There are a plurality of extent pool queues 1002 for each possible extent pool, such that a record for a volume transfer operation, also referred to as a volume relationship record (VR) is added to each extent pool queue 1002 for the extent pools from which the volume to transfer is allocated, because volumes are assigned to extent pools. The workload manager 960 may then cycle through processing the different adapter port queues 1000 and extent pool queues 1002 for the adapter port and extent pool attribute types to process records for volumes to transfer according to the operations of FIGS. 5 and 6.

There may also be queues for another attribute type, known as a resource group, where a resource group may identify a group of customers or quality of service requirements associated with the volume to transfer.

Figure 11:
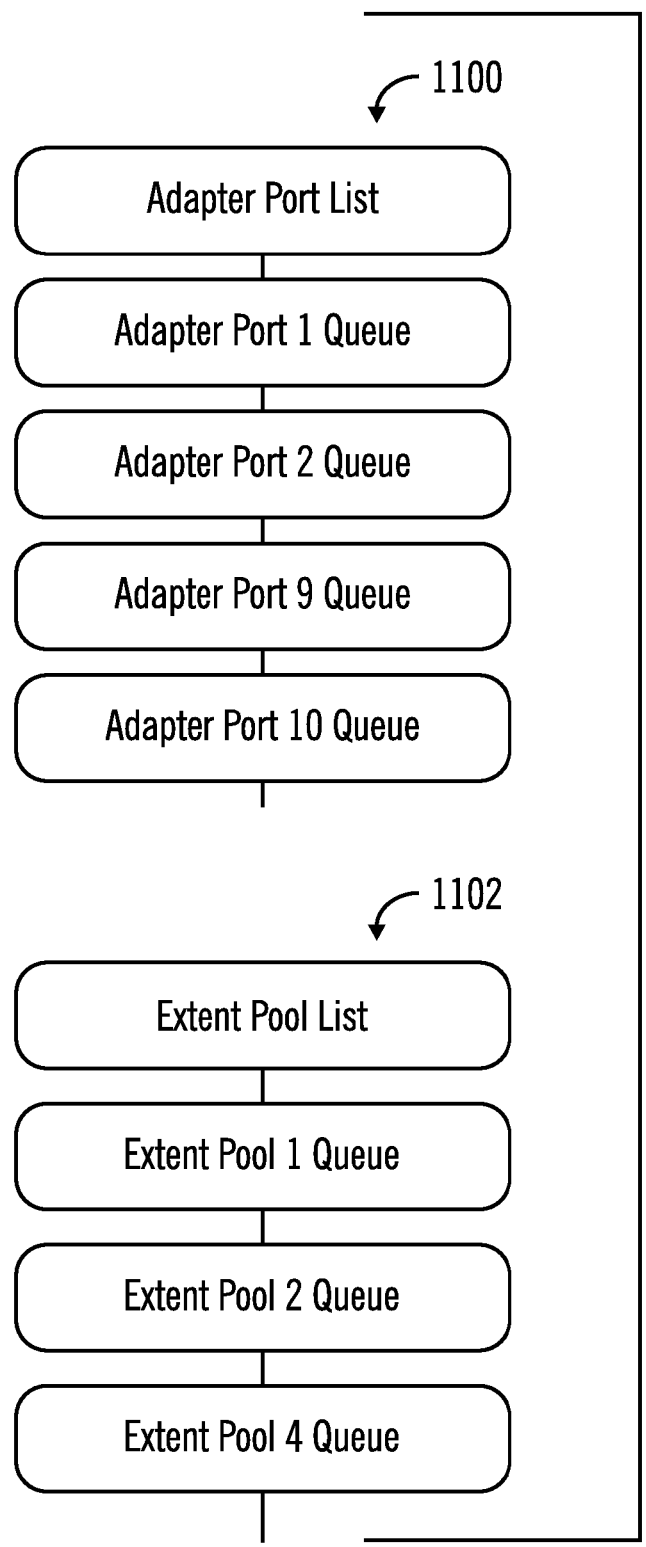
FIG. 11 illustrates an embodiment of work unit queue lists used in a data storage environment.

FIG. 11 provides an embodiment of the work unit queue lists 1100 and 1102 for the adapter port attribute type and the extent pool attribute type that include the non-empty adapter port queues 1000 and extent pool queues 1002 having records to process. The workload manager 960 may then alternate between cycling through these lists 1100 and 1102 as described with respect to FIG. 6 to determine adapter port queues 1000 and extent pool queues 1002 from which to select a volume relationship (VR) record to perform the transfer operation for the volume identified in the selected volume relationship record.

Figure 12:
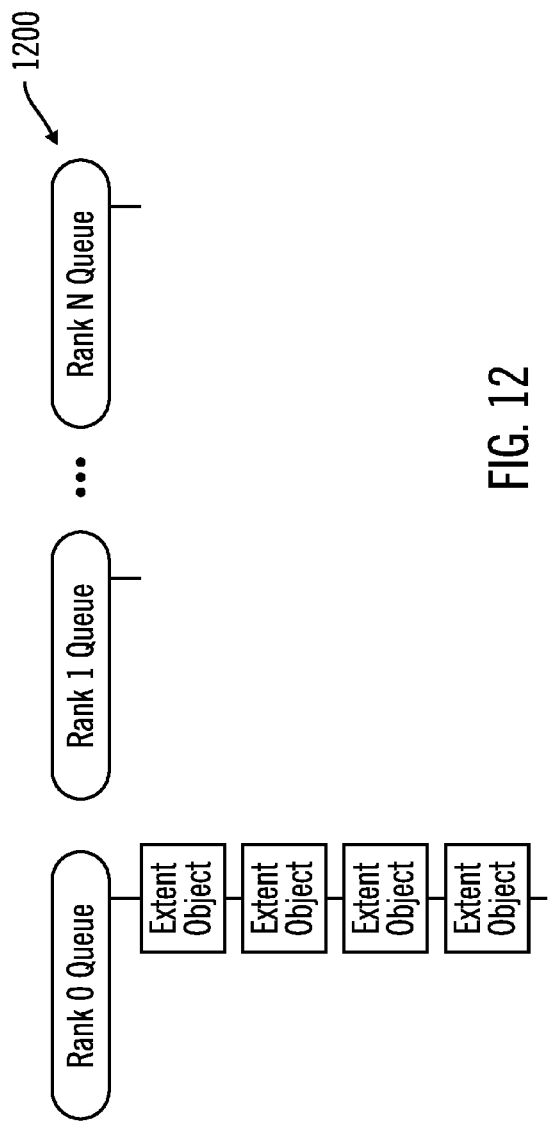
FIG. 12 illustrates an embodiment of work sub-unit queues used in a data storage environment.

FIG. 12 provides an embodiment of the work sub-unit queues as rank queues, where the record for an extent to copy is placed on the RAID rank 1200 queue corresponding to the RAID rank in the primary storage 906a in which the extent is stored. If extents from a volume 910a are stored in different RAID ranks, then the records for those extents would be placed on different RAID rank queues 1200.

Figure 13:
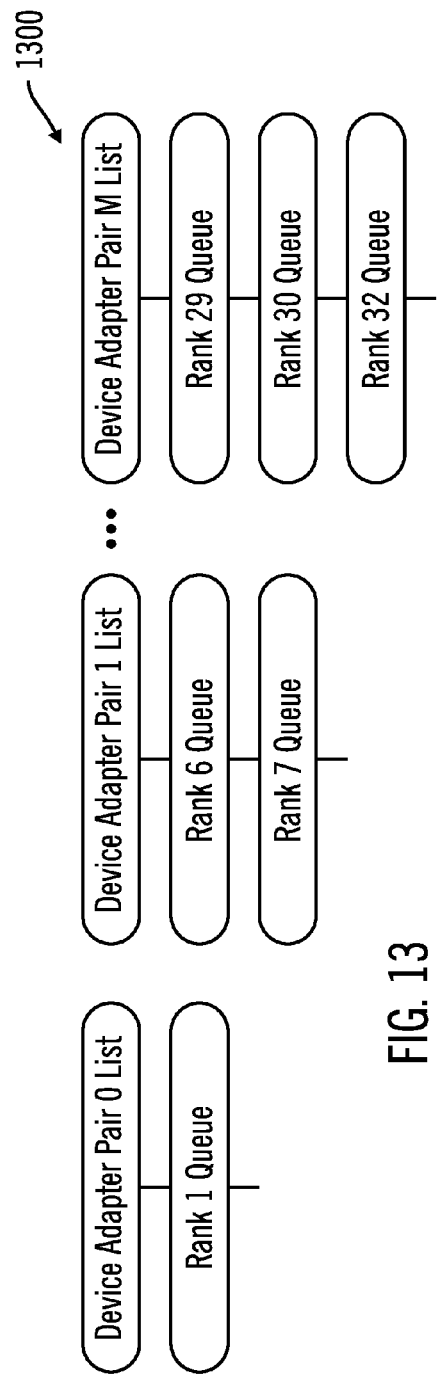
FIG. 13 illustrates an embodiment of work sub-unit queue lists used in a data storage environment.

Each RAID rank in the primary storage 906a may be accessed by a pair of device adapters in the primary controller 902a. The work sub-unit queue lists may comprise device adapter pair lists 1300 shown in FIG. 13, such that a RAID rank queue 1200 is indicated in the device adapter pair list 1300 for the device adapter pair that is used to access the RAID rank. A plurality of device adapter pair processes, such as the work-sub unit processes 109, may process the device adapter pair lists 1300, wherein there may be one device adapter pair process or agent for each device adapter pair list 1300. Each device adapter pair process may process its respective device adapter pair list 1300 to select a rank queue from the list from which to select an extent (work sub-unit) to copy. This balances selections of extents for one or more units of work to transfer according to the RAID rank in which the extent is stored and the device adapter pair in the primary controller 902a used to access that RAID rank.

The described embodiments provide techniques to distribute units of work and sub-units of work across different queues based on attribute type values associated with the units and sub-units of work. The workload manager may then cycle through processing the different queues to select a unit work and sub-units of work to process.

The reference characters used herein, such as f, i, j, k, l, m, n, are used herein to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
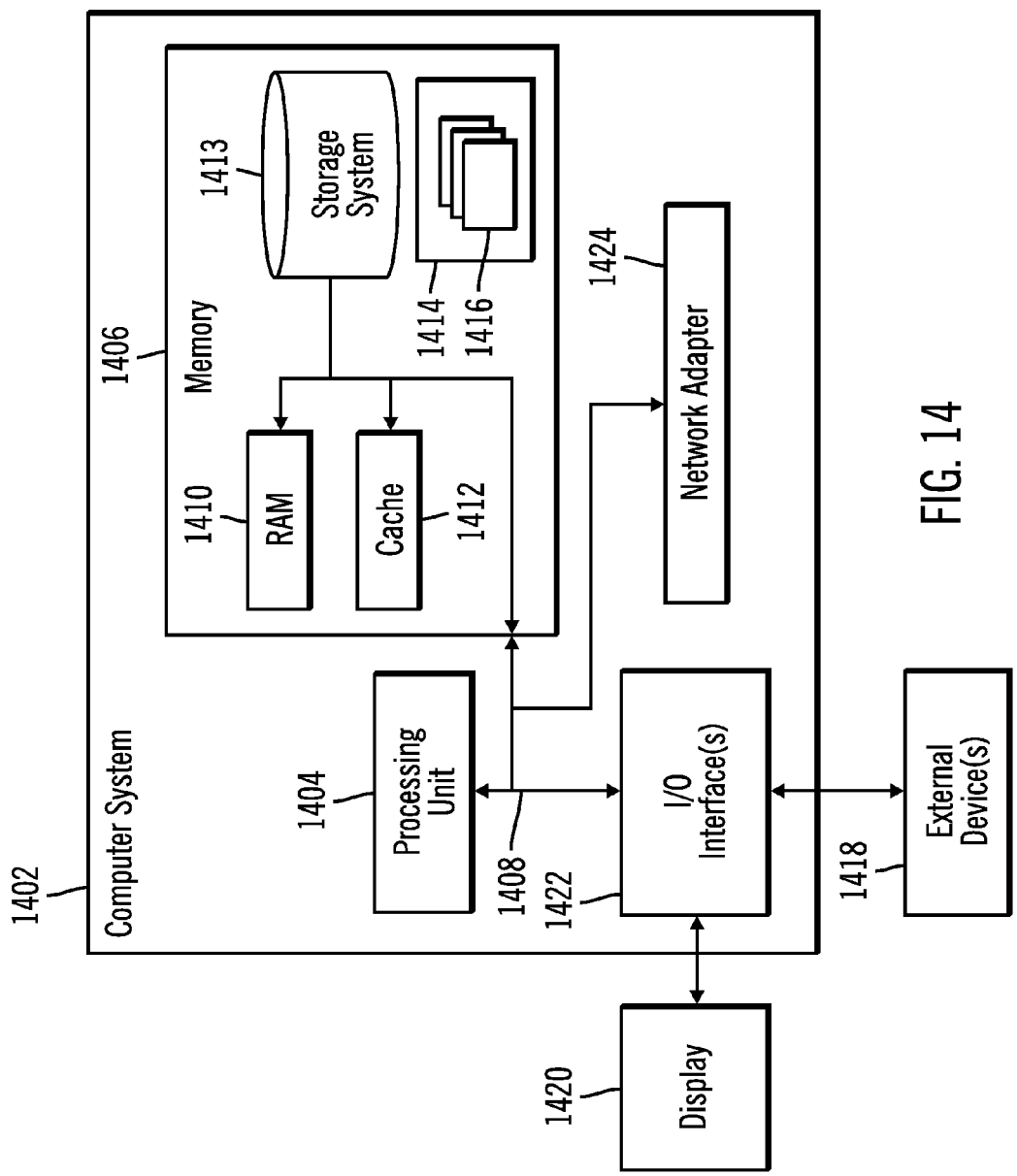
FIG. 14 illustrates a computing environment in which the components of FIGS. 1 and 7 may be implemented.

The computational components of FIG. 1, including the computing system 100 and FIG. 9 including the primary 904*a* and secondary 904*b* controllers may be implemented in one or more computer systems, such as the computer system 1402 shown in FIG. 14. Computer system/server 1402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 14, the computer system/server 1402 is shown in the form of a general-purpose computing device. The components of computer system/server 1402 may include, but are not limited to, one or more processors or processing units 1404, a system memory 1406, and a bus 1408 that couples various system components including system memory 1406 to processor 1404. Bus 1408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1402 typically includes a variety of computer system readable media. Such media may be any available media that is accessible by computer system/server 1402, and it includes both volatile and non-volatile media, removable and non-removable media.

System memory 1406 can include computer system readable media in the form of volatile memory, such as random access memory (RAM) 1410 and/or cache memory 1412. Computer system/server 1402 may further include other removable/non-removable, volatile/non-volatile computer system storage media. By way of example only, storage system 1413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1408 by one or more data media interfaces. As will be further depicted and described below, memory 1406 may include at least one program product having a set (e.g., at least one) of program modules that are configured to carry out the functions of embodiments of the invention.

Program/utility 1414, having a set (at least one) of program modules 1416, may be stored in memory 1406 by way of example, and not limitation, as well as an operating system, one or more application programs, other program modules, and program data. Each of the operating system, one or more application programs, other program modules, and program data or some combination thereof, may include an implementation of a networking environment. The components of the computer 1402 may be implemented as program modules 1416 which generally carry out the functions and/or methodologies of embodiments of the invention as described herein. The systems of FIG. 1 may be implemented in one or more computer systems 1402, where if they are implemented in multiple computer systems 1402, then the computer systems may communicate over a network.

Computer system/server 1402 may also communicate with one or more external devices 1418 such as a keyboard, a pointing device, a display 1420, etc.; one or more devices that enable a user to interact with computer system/server 1402; and/or any devices (e.g., network card, modem, etc.) that enable computer system/server 1402 to communicate with one or more other computing devices. Such communication can occur via Input/Output (I/O) interfaces 1422. Still yet, computer system/server 1402 can communicate with one or more networks such as a local area network (LAN), a general wide area network (WAN), and/or a public network (e.g., the Internet) via network adapter 1424. As depicted, network adapter 1424 communicates with the other components of computer system/server 1402 via bus 1408. It should be understood that although not shown, other hardware and/or software components could be used in conjunction with computer system/server 1402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing units of work to process in a computing system, wherein each unit of work is comprised of a plurality of sub-units of work, wherein the computer program product comprises a computer readable storage medium having program instructions embodied therewith, the program instructions executable by a processor to cause operations, the operations comprising:

maintaining a plurality of work unit queues, wherein each of the work unit queues are associated with different work unit attribute values that are associated with units of work, wherein a plurality of the work unit queues include records for units of work to process having work unit attribute values associated with the work unit attribute values of the work unit queues;

maintaining a plurality of work sub-unit queues, wherein each of the work sub-unit queues are associated with different work sub-unit attribute values that are associated with sub-units of work;

adding records for work sub-units of a unit of work to the work sub-unit queues in response to processing the unit of work from one of the work unit queues; and selecting the records for the work sub-units from the work sub-unit queues to process the sub-unit of work.

2. The computer program product of claim 1, wherein records for sub-units of work for one unit of work have different work-sub unit attribute values and are placed on multiple work-sub unit attribute queues.

3. The computer program product of claim 2, wherein the operations further comprise:

removing one of the records for the units of work from at least one of the work unit queues in which the records are contained in response to adding the records for sub-units of work for the unit of work to the work sub-unit queues.

4. The computer program product of claim 1, wherein the selecting of the records for the work sub-units comprises alternating selecting records for the work sub-units from the work sub-unit queues, wherein the operations further comprise:

alternating selecting work unit records for units of work from work unit queues.

5. The computer program product of claim 1, wherein the operations further comprise:

maintaining work sub-unit queue lists, wherein each of the work sub-unit queues is associated with one of the work sub-unit queue lists, wherein the work sub-unit queue lists indicate work sub-unit queues associated with the work sub-unit queue list having records identifying the sub-units of work to process;

wherein selecting the records for the work sub-units from the work sub-unit queues to process comprises:

selecting one of the work sub-unit queues from one of the selected work sub-unit queue lists; and selecting records from the selected work sub-unit queue for the sub-units of work to process.

6. The computer program product of claim 5, wherein the operations further comprise:

determining whether the selected work sub-unit queue from which the selected record was removed is empty; and removing the selected work sub-unit queue that is empty from the work sub-unit queue list that includes the determined work sub-unit queue.

7. The computer program product of claim 5, wherein the operations further comprise:

adding to one of the work sub-unit queue list indication of the work sub-unit queue that was empty when the work sub-unit record was added to the work sub-unit queue.

8. The computer program product of claim 1, wherein the operations further comprise:

determining work sub-units that need to be processed in response to processing the unit of work from one of the work unit queues, wherein the adding records for work sub-units of the unit of work to the work sub-unit queues comprises adding records for only the determined work sub-units that need to be processed to the work sub-unit queues.

9. The computer program product of claim 1, wherein the operations further comprise:

removing the record for the unit of work processed from the work unit queue in response to adding the records for the work sub-units of the unit of work to process to the work sub-unit queues.

10. The computer program product of claim 1, wherein the units of work to process represent volumes to transfer from a primary storage to a secondary storage, wherein the work sub-units represent extents allocated to the volumes to transfer, wherein the work sub-unit queues comprise Redundant Array of Independent Disk (RAID) rank queues for RAID ranks storing the extents of the volumes to transfer, wherein extent records for the extents of the volume to transfer are added to each of the RAID rank queues for the RAID ranks storing the extents.

11. The computer program product of claim 10, wherein each of the RAID ranks are accessible to a pair of device adapters at a primary controller that transmits the volume to a secondary controller to store in a secondary storage, wherein the operations further comprise:

maintaining device adapter pair queue lists, wherein each of the RAID rank queues are associated with one of the device adapter pair queue lists for the device adapter pair having access to the RAID rank, and wherein the device adapter pair queue lists indicate RAID rank queues associated with the device adapter pair queue list having records identifying extents to transfer to the secondary storage, wherein selecting the extents from the RAID rank queues to transfer comprises:

selecting one of the RAID rank queues from one of the device adapter pair queue lists; and selecting one of the records from the selected RAID rank queue for one of extents to transfer.

12. The computer program product of claim 11, wherein the work unit queues comprise volume queues, wherein the operations further comprise:

in response to processing one volume to transfer from one of the volume queues, determining extents in the volume that have data to transfer to the secondary storage, wherein the adding records for extents to the RAID rank queues comprises adding records for only the determined extents having data to transfer to the secondary storage.

13. A system for processing units of work to process in a computing system, wherein each unit of work is comprised of a plurality of sub-units of work, comprising:

a processor; and a computer readable storage medium having program instructions embodied therein that when executed by the processor perform operations, the operations comprising:

maintaining a plurality of work unit queues, wherein each of the work unit queues are associated with different work unit attribute values that are associated with units of work, wherein a plurality of the work unit queues include records for units of work to process having work unit attribute values associated with the work unit attribute values of the work unit queues;

maintaining a plurality of work sub-unit queues, wherein each of the work sub-unit queues are associated with different work sub-unit attribute values that are associated with sub-units of work;

adding records for work sub-units of a unit of work to the work sub-unit queues in response to processing the unit of work from one of the work unit queues; and selecting the records for the work sub-units from the work sub-unit queues to process the sub-unit of work.

14. The system of claim 13, wherein records for sub-units of work for one unit of work have different work-sub unit attribute values and are placed on multiple work-sub unit attribute queues.

15. The system of claim 13, wherein the operations further comprise:
maintaining work sub-unit queue lists, wherein each of the work sub-unit queues is associated with one of the work sub-unit queue lists, wherein the work sub-unit queue lists indicate work sub-unit queues associated with the work sub-unit queue list having records identifying the sub-units of work to process;
wherein selecting the records for the work sub-units from the work sub-unit queues to process comprises:
selecting one of the work sub-unit queues from one of the work sub-unit queue lists; and
selecting records from the selected work sub-unit queue for the sub-units of work to process.

16. The system of claim 13, wherein the operations further comprise:
determining work sub-units that need to be processed in response to processing the unit of work from one of the work unit queues, wherein the adding records for work sub-units of the unit of work to the work sub-unit queues comprises adding records for only the determined work sub-units that need to be processed to the work sub-unit queues.

17. The system of claim 13, wherein the units of work to process represent volumes to transfer from a primary storage to a secondary storage, wherein the work sub-units represent extents allocated to the volumes to transfer, wherein the work sub-unit queues comprise Redundant Array of Independent Disk (RAID) rank queues for RAID ranks storing the extents of the volumes to transfer, wherein extent records for the extents of the volume to transfer are added to each of the RAID rank queues for the RAID ranks storing the extents.

18. The system of claim 17, wherein each of the RAID ranks are accessible to a pair of device adapters at a primary controller that transmits the volume to a secondary controller to store in a secondary storage, wherein the operations further comprise:
maintaining device adapter pair queue lists, wherein each of the RAID rank queues are associated with one of the device adapter pair queue lists for the device adapter pair having access to the RAID rank, and wherein the device adapter pair queue lists indicate RAID rank queues associated with the device adapter pair queue list having records identifying extents to transfer to the secondary storage,
wherein selecting the extents from the RAID rank queues to transfer comprises:
selecting one of the RAID rank queues from one of the device adapter pair queue lists; and
selecting one of the records from the selected RAID rank queue for one of extents to transfer.

19. A method for processing units of work to process in a computing system, wherein each unit of work is comprised of a plurality of sub-units of work, the method executed by a processor of the computing system, comprising:
maintaining a plurality of work unit queues, wherein each of the work unit queues are associated with different work unit attribute values that are associated with units of work, wherein a plurality of the work unit queues include records for units of work to process having work unit attribute values associated with the work unit attribute values of the work unit queues;
maintaining a plurality of work sub-unit queues, wherein each of the work sub-unit queues are associated with different work sub-unit attribute values that are associated with sub-units of work;
adding records for work sub-units of a unit of work to the work sub-unit queues in response to processing the unit of work from one of the work unit queues; and
selecting the records for the work sub-units from the work sub-unit queues to process the sub-unit of work.

20. The method of claim 19, wherein records for sub-units of work for one unit of work have different work-sub unit attribute values and are placed on multiple work-sub unit attribute queues.

21. The method of claim 19, further comprising:
maintaining work sub-unit queue lists, wherein each of the work sub-unit queues is associated with one of the work sub-unit queue lists, wherein the work sub-unit queue lists indicate work sub-unit queues associated with the work sub-unit queue list having records identifying the sub-units of work to process;
wherein selecting the records for the work sub-units from the work sub-unit queues to process comprises:
selecting one of the work sub-unit queues from one of the work sub-unit queue lists; and
selecting records from the selected work sub-unit queue for the sub-units of work to process.

22. The method of claim 19, further comprising:
determining work sub-units that need to be processed in response to processing the unit of work from one of the work unit queues, wherein the adding records for work sub-units of the unit of work to the work sub-unit queues comprises adding records for only the determined work sub-units that need to be processed to the work sub-unit queues.

23. The method of claim 19, wherein the units of work to process represent volumes to transfer from a primary storage to a secondary storage, wherein the work sub-units represent extents allocated to the volumes to transfer, wherein the work sub-unit queues comprise Redundant Array of Independent Disk (RAID) rank queues for RAID ranks storing the extents of the volumes to transfer, wherein extent records for the extents of the volume to transfer are added to each of the RAID rank queues for the RAID ranks storing the extents.

24. The method of claim 23, wherein each of the RAID ranks are accessible to a pair of device adapters at a primary controller that transmits the volume to a secondary controller to store in a secondary storage, further comprising:
maintaining device adapter pair queue lists, wherein each of the RAID rank queues are associated with one of the device adapter pair queue lists for the device adapter pair having access to the RAID rank, and wherein the device adapter pair queue lists indicate RAID rank queues associated with the device adapter pair queue list having records identifying extents to transfer to the secondary storage,
wherein selecting the extents from the RAID rank queues to transfer comprises:
selecting one of the RAID rank queues from one of the device adapter pair queue lists; and
selecting one of the records from the selected RAID rank queue for one of extents to transfer.

* * * * *